(12) United States Patent
FitzGibbon et al.

(10) Patent No.: US 10,753,476 B2
(45) Date of Patent: Aug. 25, 2020

(54) MECHANICAL SEAL WITH HYDRO-PAD FACE PROFILE

(71) Applicant: JOHN CRANE GROUP CORPORATION, Chicago, IL (US)

(72) Inventors: Gibbon FitzGibbon, Manchester (GB); Ebrahim Jahromi, Lindenhurst, IL (US)

(73) Assignee: JOHN CRANE GROUP CORPORATION, Chicago, IL (US)

( * ) Notice: Subject to any disclaimer, the term of this patent is extended or adjusted under 35 U.S.C. 154(b) by 580 days.

(21) Appl. No.: 14/875,098

(22) Filed: Oct. 5, 2015

(65) Prior Publication Data

US 2016/0097456 A1    Apr. 7, 2016

Related U.S. Application Data

(60) Provisional application No. 62/060,139, filed on Oct. 6, 2014.

(51) Int. Cl.
*F16J 15/34* (2006.01)

(52) U.S. Cl.
CPC ......... *F16J 15/342* (2013.01); *F16J 15/3412* (2013.01); *F16J 15/3452* (2013.01); *F16J 15/3464* (2013.01)

(58) Field of Classification Search
CPC .... F16J 15/342; F16J 15/3412; F16J 15/3452; F16J 15/34; F16J 15/3404
See application file for complete search history.

(56) References Cited

U.S. PATENT DOCUMENTS 3,383,116 A * 5/1968 Carter ................. F16J 15/3412
                                                        277/385
3,588,979 A    6/1971 Miller
3,694,894 A   10/1972 Jelinek et al.
(Continued)

FOREIGN PATENT DOCUMENTS

DE    3428744 A1    2/1985
EP    0404358 A2   12/1990
(Continued)

OTHER PUBLICATIONS

European Patent Office, International Search Report, in European Patent Application No. PCT/US2015/054002 (dated Jan. 15, 2016).
(Continued)

*Primary Examiner* — Eugene G Byrd
(74) *Attorney, Agent, or Firm* — Cantor Colburn LLP

(57) ABSTRACT

A rotary end face seal assembly to seal a fluid under pressure includes a pair of annular mating ring seal faces with one of the faces defining a sealing interface between radially inner and radially outer peripheral edges. A plurality of hydro-pad recesses are formed radially inwardly from the peripheral edge of one of the seal faces at the pressure side of the seal assembly at peripherally spaced intervals and a plurality of feeder grooves are formed radially inwardly from the same peripheral edge of the seal face between at least some hydro-pad recesses. The radial extent of the feeder grooves is longer than the radial extent of the hydro-pad recesses. In one form a feeder groove is disposed between adjacent hydro-pad recesses. In another form a feeder groove is disposed between adjacent pairs of hydro-pad recesses.

17 Claims, 2 Drawing Sheets

(56) References Cited

U.S. PATENT DOCUMENTS

| | | | | |
|---|---|---|---|---|
| 3,695,789 | A | * | 10/1972 | Jansson ................. F01C 21/003 |
| | | | | 277/361 |
| 3,744,805 | A | * | 7/1973 | Heinrich ............. F16J 15/3412 |
| | | | | 277/400 |
| 3,824,660 | A | | 7/1974 | Lowe |
| 4,209,884 | A | | 7/1980 | Atkinson |
| 4,314,704 | A | | 2/1982 | Wichall |
| 4,407,512 | A | | 10/1983 | Trytek |
| 5,092,612 | A | * | 3/1992 | Victor ................. F16J 15/3412 |
| | | | | 277/400 |
| 5,180,173 | A | | 1/1993 | Kimura et al. |
| 5,368,314 | A | | 11/1994 | Victor et al. |
| 5,529,317 | A | | 6/1996 | Muller |
| 5,722,665 | A | * | 3/1998 | Sedy ................... F16J 15/3412 |
| | | | | 277/400 |
| 5,938,206 | A | * | 8/1999 | Klosterman ......... F16J 15/3468 |
| | | | | 277/358 |
| 6,454,268 | B1 | * | 9/2002 | Muraki ................ F16J 15/3412 |
| | | | | 277/361 |
| 7,001,565 | B2 | | 2/2006 | Phelan et al. |
| 7,377,518 | B2 | | 5/2008 | Lai |
| 9,353,865 | B2 | * | 5/2016 | Lattin ................... F16J 15/342 |
| 9,574,666 | B2 | * | 2/2017 | Ferris ................... F16J 15/3412 |
| 9,657,842 | B2 | * | 5/2017 | Kirchner .............. F16J 15/3412 |
| 2003/0024095 | A1 | | 2/2003 | Spielmannleitner |
| 2004/0232622 | A1 | * | 11/2004 | Gozdawa ............. F16J 15/342 |
| | | | | 277/401 |

FOREIGN PATENT DOCUMENTS

| | | |
|---|---|---|
| EP | 0 592 462 B1 | 5/1992 |
| GB | 2296052 A | 6/1996 |
| JP | 2-236067 A | 9/1990 |
| JP | 4-54382 A | 2/1992 |
| WO | WO 2014/103630 A1 | 7/2014 |
| WO | WO 2014/112455 A1 | 7/2014 |

OTHER PUBLICATIONS

European Patent Office, Written Opinion of the International Searching Authority, in European Patent Application No. PCT/US2015/054002 (dated Jan. 15, 2016).

Communication dated Apr. 20, 2018 for EP Application No. 15782182.8, 4 pages.

* cited by examiner

MECHANICAL SEAL WITH HYDRO-PAD FACE PROFILE

CROSS REFERENCE TO RELATED APPLICATIONS

This application claims benefit of U.S. Provisional Patent Application Ser. No. 62/060,139, filed Oct. 6, 2014, which is incorporated herein in its entirety by reference.

TECHNICAL FIELD

This disclosure relates to rotary mechanical end face seals for liquid. More particularly, it relates to such seals that include a hydro-pad profile on one seal face to augment penetration of sealed fluid between relatively rotating sealing faces.

BACKGROUND

Rotary mechanical end face seals find wide application in pumps for pumping a liquid process fluid. As disclosed in U.S. Pat. No. 4,407,512, owned by John Crane Inc., Morton Grove, Ill., hydro-pad relieved areas, or depressions, on one of the relatively rotating seal faces is a configuration to enhance flow of process fluid between the relatively rotating sealing faces to provide a liquid film for lubrication. Typically, hydro-pad reliefs or depressions take the form of arcuate (scalloped) areas positioned at periodic intervals open at the peripheral edge of a seal face exposed to operating pressure of the process fluid. Typically such relieved areas have been formed to a depth of approximately 1.0 mm from the sealing face of the annular seal ring.

One common usage of rotary mechanical end face seals is found in power plant boiler feed water pumps. This application presents generally severe operating conditions, usually process fluid operating temperatures of 390° F. (200° Centigrade) at a pressure of 30 bar (450 psi).

Water at these pressures and temperatures is not a good lubricant. Because of the pressure drop across the seal face, the process fluid flashes to steam. It is common practice in such applications to provide separate cooling water flush for the seal to maintain its functionality, maintain reasonable durability and prevent excess leakage. Such auxiliary equipment and processing adds to both installation and incremental operating expense.

The arrangement disclosed here provides a seal for a boiler feed pump that does not require external cooling. It is configured to operate without any separate cooling water delivery system. It is an uncooled seal.

SUMMARY

A rotary end face seal assembly to seal a fluid under pressure includes a pair of annular mating ring seal faces with one of the faces defining a sealing interface between radially inner and radially outer peripheral edges. A plurality of hydro-pad recesses are formed radially inwardly from the peripheral edge of one of the seal faces at the pressure side of the seal assembly at peripherally spaced intervals and a plurality of feeder grooves are formed radially inwardly from the same peripheral edge of the seal face between at least some hydro-pad recesses.

DETAILED DESCRIPTION OF ILLUSTRATED EMBODIMENT

Figure 1:
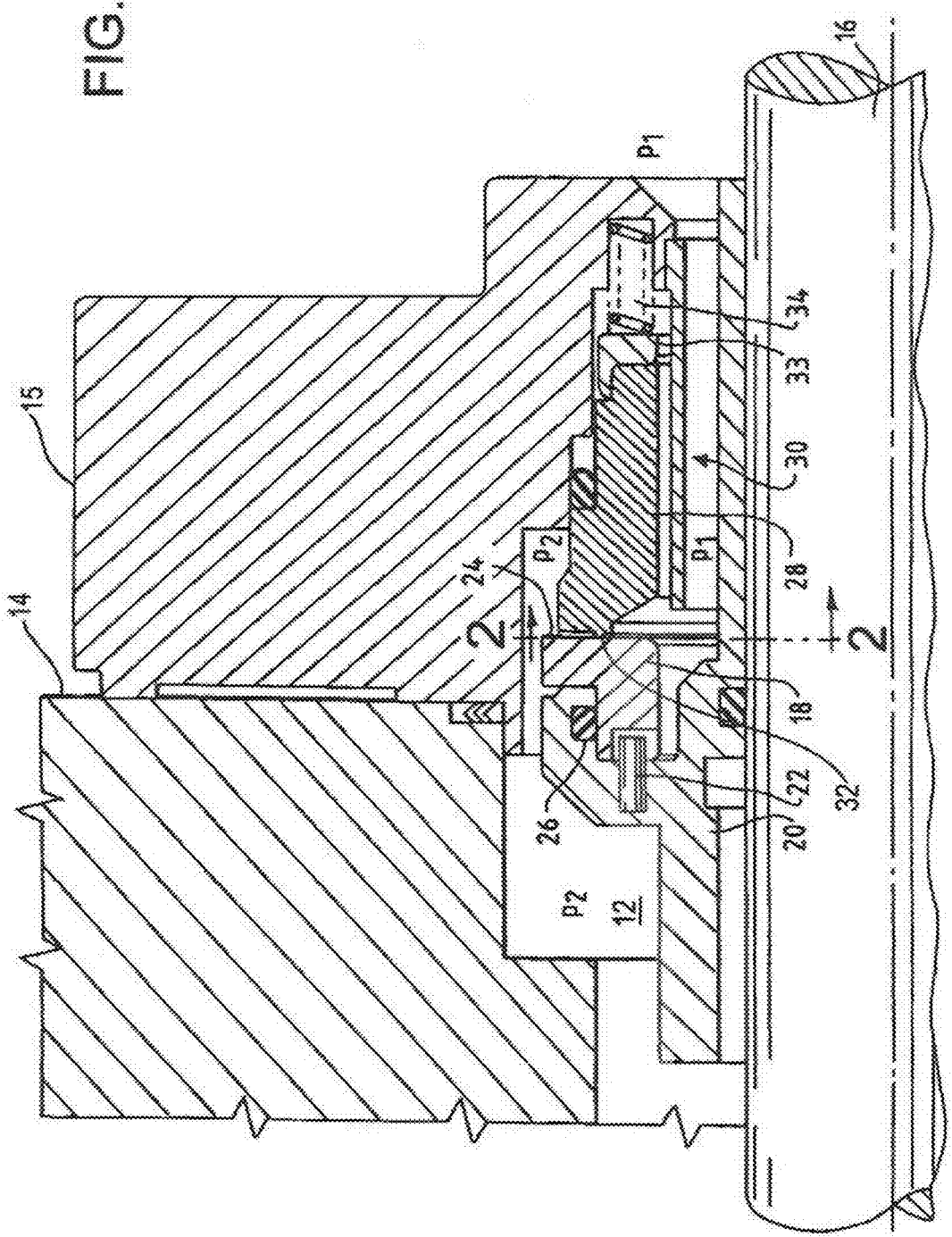
FIG. 1 is a sectional side view of a seal assembly of the present disclosure within a pump, such as a boiler feed water pump.

Referring now to FIG. 1, an inventive seal arrangement is illustrated in a single rotary mechanical end face seal assembly with process or high pressure at the outer edge of the seal faces and ambient or low pressure at the inner edge of the seal faces. The seal arrangement is intended to seal a fluid, in this case, a liquid, namely water at high temperature and pressure.

The seal arrangement is intended to seal a fluid within a chamber 12 defined by a housing 14 and attached gland plate 15. A shaft 16 extends through the housing 14. Because the shaft 16 is intended to rotate relative to the housing 14, a seal must be provided to prevent or inhibit leakage of the fluid from the chamber 12.

The seal assembly includes a seal ring configuration comprising a mating ring 18 rotationally fixed relative to a sleeve 20 by a pin 22. The sleeve 20 is mounted on the shaft 16 and rotates with the shaft. The mating ring 18 includes an annular mating ring seal face 24. An O-ring 26 seals the mating ring 18 to the sleeve 20 so that no leakage occurs through this connection.

The seal ring assembly also includes an axially movable primary ring 28 retained within a gland adaptor assembly 30. The primary ring 28 includes an annular primary ring seal face 32, illustrated in greater detail in FIG. 2.

The seal assembly defines with the pump housing 14 and gland plate 15 a high pressure zone $P_2$, known as the process zone, in the chamber 12 upstream of the seal faces 24 and 32. A low pressure zone $P_1$ exists down-stream of the seal faces 24 and 32. This arrangement is sometimes referred to as an O.D. pressurized seal assembly.

The primary ring 28 is axially biased by a biasing mechanism, such as a spring 34. A disk 33 is situated axially between the spring 34 and the primary ring 28. The spring 34 biases the primary ring 28 toward the mating ring 18, urging the primary ring seal face 32 into face-to-face sealing relation with the mating ring seal face 24.

The primary ring seal face 32 engages the mating ring seal face 24 along a sealing interface, which inhibits the escape of process fluid from the high pressure zone $P_2$ to the low pressure zone $P_1$. Because, in the illustrated embodiment, the annular mating ring seal face 24 is wider, in the radial direction, than the annular primary ring seal face 32, the interface is coextensive with the radial extent of the annular primary ring seal face 32. It must be understood however, that the interface could be defined by the mating ring seal face operating against a primary ring seal face of greater radial width.

Figure 2:
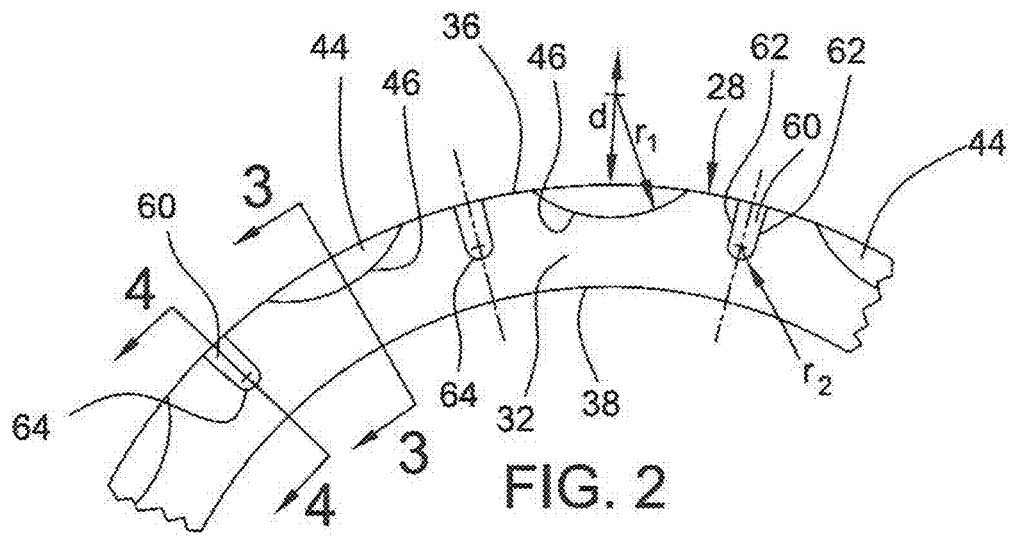
FIG. 2 is a fragmentary plan view, of the annular seal face of the primary ring of the seal assembly of FIG. 1.
Figure 3:
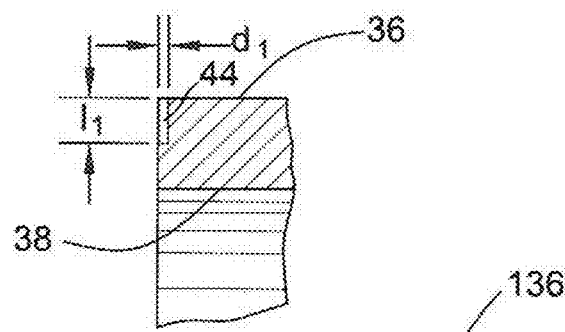
FIG. 3 is a sectional view taken along the line 3-3 of FIG. 2 of one of the hydro-pad recesses formed on the annular seal face of the primary ring of the assembly of FIG. 1.
Figure 4:
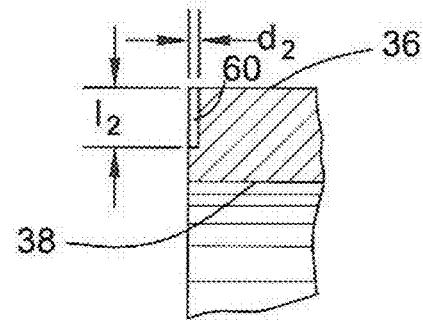
FIG. 4 is a sectional view taken along the line 4-4 of FIG. 2 of one of the feeder groove formed on the annular seal face of the primary ring of FIG. 1, illustrating the principles of the disclosed seal face configuration.

The annular seal face 32 of primary ring 28 is illustrated in detail in FIGS. 2-4. The annular primary ring seal face 32 is defined by a radially outer edge or periphery 36 and a radially inner edge or periphery 38, thus illustrative of an O.D. pressurized seal. The sealing interface is coextensive with the annular seal face 32 between the outer and inner peripheral edges 36 and 38. In this embodiment the outer perimeter or edge 36 is exposed to the high pressure process fluid within the pump.

Referring to FIGS. 2-4, the primary ring seal face 32 and therefore the seal interface, defines a pumping mechanism in the form of plurality of spaced grooves or reliefs 44 disposed at spaced intervals about the peripheral edge 36 of primary seal ring seal face 32. They take the form of segments of a circle and are generally known in the art as hydro-pad recesses. This pumping mechanism is formed on the annular surface of the primary ring seal face 32 extending from the pressure side of the seal, the outer peripheral edge 36 toward the low pressure side, the inner peripheral edge 38.

Each hydro-pad recess 44 is a crescent-shaped relief open at the outer peripheral edge 36 of seal face 32. It has a radially inner terminus defined by a circular edge 46. The radial extent or "length" of the hydro-pad recess on seal face 32 is the distance from the outer edge 36 of seal face 32 to the radial innermost extent of the recess 44 ($l_1$ in FIG. 3). It is determined by the length of radius "$r_1$" of the circle defining the edge 46 minus the radial distance "d" between the centroid from which it is drawn to the outer peripheral edge 36 of the annular primary ring seal face 32. (See FIG. 2)

The axial depth $d_1$ of each hydro-pad recess 44 as illustrated in this embodiment, relative to the seal face 32 is preferably 1.0 mm (0.04 in.).

The hydro-pad reliefs 44 serve to create a hydrodynamic force of process fluid between the primary ring seal face 32 and the mating ring seal face 24 when the seal is in operation. The reliefs 44 draw process fluid into the interface. The created hydrodynamic force causes the seal faces 24 and 32 to separate slightly and reduces the friction between the primary ring 28 and the mating ring 18. Presence of process fluid between the faces creates a liquid film which reduces friction. It also provides for reduced temperature and thermal distortion.

In accordance with the present disclosure in the embodiment of FIGS. 1-4, the seal face 32 of the primary ring 28 also includes a series of radial slots or feeder grooves 60 disposed intermediate each adjacent pair of hydro-pads recesses 44. Each feeder groove 60 is open at the outer peripheral edge 36 of the seal ring face 32 and recessed from the annular face 32 of the primary ring 28 an axial depth of about 1.0 mm (0.04 in.).

Each groove 60 terminates at semi-circular terminus wall 64. The radial extent or length "$l_2$" of each feeder groove 60 is somewhat longer than the radial extent or length discussed above, of each hydro-pad recess 44 (as seen in FIG. 4). It is expected that such length could be about 110 to 200 percent (%) of the radial extent of the hydro-pad recess 46. (See FIGS. 3 and 4).

As illustrated in FIG. 2, each feeder groove includes side walls 62 parallel to a radial line midway between adjacent hydro-pad recesses 44, i.e., alternating hydro-pad recesses and feeder grooves. The width of each feeder groove 60 between walls 62 is approximately 5 mm (0.2 in.). However, it is within the scope of the disclosure to vary this relationship. That is, the number of feeder grooves 60 may differ from the number of hydro-pad recesses 44.

It is contemplated that during pump operation, the combined interaction at the seal interface, of the hydro-pad reliefs 44 and feeder grooves 60, draws sufficient process fluid between the faces to provide adequate lubrication even at the higher operating pressure and temperature conditions within the pump. Moreover, the probable presence of greater amounts of liquid within the interface ensure that the fluid remains in a liquid state promoting better lubrication. It is also contemplated that enhanced lubrication will result in face temperature control and consequently maintain leakage at acceptable levels.

Figure 5:
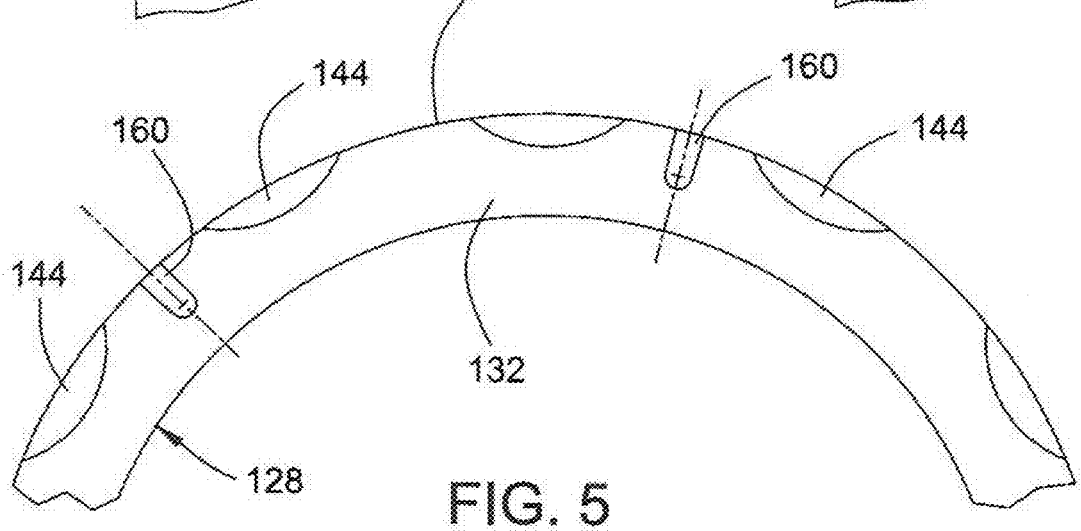
FIG. 5 is a fragmentary plan view of an annular seal face illustrative of another embodiment of the seal assembly in accordance with the disclosure.

FIG. 5 illustrates an alternative arrangement, contemplated within the scope of the present disclosure. Referring to FIG. 5, a seal ring seal face 132 defines a pumping mechanism in the form of a plurality of equally spaced grooves or reliefs 144 shaped as a segment of a circle, generally known as hydro-pad recesses. This pumping mechanism is formed on the annular surface of seal ring face 132 along the radially outer peripheral edge 136 exposed to the high pressure process fluid. Hydro-pad recesses are sized and shaped as described in connection with the embodiment of FIGS. 1-4 and function similarly.

The seal ring 128 illustrated in FIG. 5 includes a radial feeder slot or feeder groove 160 disposed between pairs of adjacent hydro-pad recesses 144. That is, radial slots or feeder grooves 160 are disposed circumferentially about the peripheral edge 136 of seal face 132 between adjacent pairs of hydro-pad recesses 144, i.e., two hydro-pad recesses, one feeder groove, two hydro-pad recesses. These feeder grooves are sized and shaped as described in connection with the embodiment of FIGS. 1-4. They function similarly to the feeder grooves 60 of the earlier embodiment.

It is contemplated that the pattern, as shown in FIG. 5, would be useful in pump applications where process pressures are higher or less ingress of processing fluid into the seal interface is deemed appropriate. This embodiment also illustrates that within the scope of the disclosure any combination of hydro-pad recesses and feeder grooves could be configured, for specific pump applications.

Illustrated herein in FIGS. 1-4 and 5 are seal arrangements in accordance with the disclosure. They are exemplary of the principles discussed and not limiting in any way. The principles are applicable to other seal applications, sizes and operating conditions.

Regarding a specific operable embodiment, a seal assembly as shown in FIGS. 1-4 of the drawings is considered suitable for a pump having a rotatable shaft, 150 mm (6 in.) in diameter. The exemplary pump, intended for pumping boiler feed water, may operate at a temperature of 200° C. (390° F.) at a pressure of 30 bar (450 psi). The pump shaft may operate at speeds between 1500 to 6000 rpm.

The diameter of the outer peripheral edge 36 of the annular primary ring seal face 32, which is the high pressure seals of the seal interface, may be 190 mm (7.5 in.). The diameter of the inner peripheral edge 38 of the annular primary ring seal face 32, may be 165 mm (6.5 in.). The radial extent of the seal face 32 between peripheral edge 36 and peripheral edge 38 may be 12 mm (0.5 in.).

The seal face 32 of the exemplary primary ring 28 has sixteen (16) equally spaced hydro-pad recesses 44 spaced about the annular primary ring seal face 32. Each has a circular edge 46 formed by a circle radius of 10 mm (0.4 inch) drawn from a center point 200 mm (8 inches) radially outward from the outer peripheral edge 36 a distance of 6 mm (0.25 in.). The radial extent $l_1$ (seen in FIG. 3) of each hydro-pad recess 44 from the outer peripheral edge 36 to its radially innermost point on circular edge 46 is 3 mm (0.125 in.). Each has a depth from the face surface of annular primary ring seal face 32 of 1 mm (0.04 in.).

One feeder groove 60 is disposed midway between each adjacent pair of hydro-pad recesses 44. Each feeder groove has a length $l_2$ (see FIG. 4) of 6 mm (0.25 in.) and depth from the surface of annular primary ring seal face 32 of 1 mm (0.04 in.). Each has a circumferential width of 5 mm (0.2 in.) between walls 62 with a radial inward end defined by a semi circular terminus wall formed by a radius $r_2$ of 2.5 mm (0.1 in.).

The foregoing illustration is only one example of the disclosed principles. The dimensional relationships may be varied to accommodate different operating parameters. This disclosure is applicable to pumps for liquid operating at typically not limited to temperatures from −50 to 300 degree C. (−60 to 600 degrees F.) and pressure up to 1500 psi (100 bar). Other applications may include pure light hydrocarbons (such as ethane) or mixtures (such as LNG), any fluid operating near to its vapor point, high speed duties where centrifugal force acts to limit fluid penetration into the sealing interface, or any application where enhanced lubrication is required.

Variations and modification of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the invention and will enable others skilled in the art to make and utilize the invention. The claims are to be construed to include alternative embodiments to the extent permitted by the prior art.

The invention claimed is:

1. A rotary end face seal assembly, the rotary end face seal assembly comprising:
a mating ring having an annular mating ring seal face;
an axially movable primary ring having an annular primary ring seal face;
a biasing element biasing the primary ring toward the mating ring, the mating ring seal face and the primary ring seal face disposed in a face-to-face sealing relation and defining a contacting seal interface between a radial outer peripheral edge and a radial inner peripheral edge of the seal face;
wherein the primary ring seal face defines a plurality of hydro-pad recesses and a plurality of radial feeder grooves,
wherein the plurality of hydro-pad recesses extend radially inwardly at peripherally spaced intervals from the radial outer peripheral edge,
wherein each of the plurality of feeder grooves extend radially inward from the radial outer peripheral edge and include a pair of parallel side walls that are parallel to a radial line midway between each pair of adjacent hydro-pad recesses.

2. The rotary end face seal assembly of claim 1, wherein the plurality of radial feeder grooves extend radially inwardly a radial distance greater than the radial inward extent of the plurality of hydro-pad recesses.

3. The rotary end face seal assembly of claim 2, wherein the inward radial extent of the plurality of radial feeder grooves is 110 to 200 percent of the radial inward extent of the plurality of hydro-pad recesses.

4. The rotary end face seal assembly of claim 1, wherein each of the plurality of hydro-pad recesses includes a radially inner terminus.

5. The rotary end face seal assembly of claim 4, wherein the radially inner terminus of each hydro-pad recess is defined by a circular edge.

6. The rotary end face seal assembly of claim 5, wherein each of the plurality of radial feeder grooves terminates at a semi-circular terminus wall.

7. The rotary end face seal assembly of claim 1, wherein each of the plurality of hydro-pad recesses has an axial depth of about 1.0 mm into the seal face.

8. The rotary end face seal assembly of claim 7, wherein each of the plurality of feeder grooves has an axial depth of about 1.0 mm into the seal face.

9. The rotary end face seal assembly of claim 1, wherein said plurality of hydro-pad recesses are equally spaced about said periphery of the contacting seal interface.

10. The rotary end face seal assembly of claim 9, wherein each radial feeder groove is disposed intermediate adjacent hydro-pad recesses.

11. The rotary end face seal assembly of claim 10, wherein each radial feeder groove extends radially inwardly a radial distance greater than the radial inward extent of said plurality of hydro-pad recesses.

12. The rotary end face seal assembly of claim 11, wherein each of the plurality of hydro-pad recesses includes a radially inner terminus, wherein the radially inner terminus is defined by a circular edge.

13. The rotary end face seal assembly of claim 12, wherein the pair of parallel side walls of each radial feeder groove terminates at a semi-circular terminus wall.

14. The rotary end face seal assembly of claim 1, wherein each radial feeder groove is disposed between adjacent pairs of hydro-pad recesses.

15. The rotary end face seal assembly of claim 14, wherein each of the plurality of hydro-pad recesses includes a radially inner terminus, wherein the radially inner terminus is defined by a circular edge.

16. The rotary end face seal assembly of claim 15, wherein the pair of parallel side walls of each radial feeder groove terminates at a semi-circular terminus wall.

17. The rotary end face seal assembly of claim 14, wherein the plurality of hydro-pad recesses are equally peripherally spaced about the periphery of the contacting seal interface.

* * * * *